United States Patent
Volpone et al.

(10) Patent No.: US 9,758,114 B1
(45) Date of Patent: Sep. 12, 2017

(54) WIRE HARNESS ASSEMBLY WITH A GROMMET HAVING A WIRE SPACING RETAINER AND METHOD FOR MANUFACTURING SAME

(71) Applicant: Delphi Technologies, Inc., Troy, MI (US)

(72) Inventors: Thomas A. Volpone, Cortland, OH (US); Michael Bashkin, Aurora, OH (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 15/159,346

(22) Filed: May 19, 2016

(51) Int. Cl.
| | | |
|---|---|---|
| *B60R 16/02* | (2006.01) | |
| *H01B 17/30* | (2006.01) | |
| *H01B 13/012* | (2006.01) | |
| *H01B 13/00* | (2006.01) | |
| *B29C 45/14* | (2006.01) | |
| *B29K 75/00* | (2006.01) | |
| *B29K 677/00* | (2006.01) | |
| *B29L 31/34* | (2006.01) | |

(52) U.S. Cl.
CPC ..... *B60R 16/0222* (2013.01); *H01B 13/0013* (2013.01); *H01B 13/01209* (2013.01); *H01B 17/306* (2013.01); *B29C 45/14065* (2013.01); *B29C 45/14639* (2013.01); *B29C 2045/14131* (2013.01); *B29K 2075/00* (2013.01); *B29K 2677/00* (2013.01); *B29L 2031/3462* (2013.01)

(58) Field of Classification Search
USPC ......................................................... 174/72 A
See application file for complete search history.

(56) References Cited

U.S. PATENT DOCUMENTS

| | | | | |
|---|---|---|---|---|
| 3,753,212 | A * | 8/1973 | Yamada ................ | H01R 13/28 439/358 |
| 4,289,924 | A | 9/1981 | Pearce, Jr. et al. | |
| 4,851,611 | A * | 7/1989 | De Concini ........... | H02G 3/083 174/541 |
| 5,123,862 | A * | 6/1992 | Suzuki ............... | H01R 13/5202 439/533 |
| 5,170,017 | A * | 12/1992 | Stanevich ............ | H02G 15/013 174/151 |
| 5,328,388 | A * | 7/1994 | Fust ..................... | H01R 13/514 439/364 |

(Continued)

*Primary Examiner* — William H Mayo, III
*Assistant Examiner* — Krystal Robinson
(74) *Attorney, Agent, or Firm* — Robert J. Myers

(57) ABSTRACT

A wire harness assembly and a method of forming such a wire harness assembly is presented. The wire harness assembly includes a plurality of wire cables and a wire support defining elongate slots having open and closed ends. The cables are disposed within the slots. Retaining teeth are defined by side walls of the slots and are configured to separate one wire cable from another wire cable in the same slot. The wire harness assembly also includes a slug formed of a moldable material that encases the wire support. The slug also encases a portion of each of the wire cables. The wire harness assembly further includes a grommet encircling the slug. The slug may be formed by disposing the cables within the slots of the wire support, arranging the wire support and the cables in a mold, injecting a moldable material into the mold, and curing the moldable material.

20 Claims, 5 Drawing Sheets

(56) References Cited

U.S. PATENT DOCUMENTS

| | | | | |
|---|---|---|---|---|
| 5,545,854 | A * | 8/1996 | Ishida | H02G 3/081 16/2.2 |
| 5,775,944 | A * | 7/1998 | Flask | H01R 13/743 439/556 |
| 6,089,910 | A * | 7/2000 | Suzuki | H01R 13/5202 439/281 |
| 6,450,834 | B1 * | 9/2002 | Polgar | H01R 13/74 439/247 |
| 8,979,580 | B2 * | 3/2015 | Bitzer | H01R 13/5202 439/271 |
| 2003/0010519 | A1 * | 1/2003 | Pieck | G02B 6/4428 174/659 |
| 2007/0184701 | A1 * | 8/2007 | Yagome | H01R 13/506 439/271 |
| 2012/0048616 | A1 * | 3/2012 | Breen, IV | H02G 3/22 174/651 |

* cited by examiner

WIRE HARNESS ASSEMBLY WITH A GROMMET HAVING A WIRE SPACING RETAINER AND METHOD FOR MANUFACTURING SAME

TECHNICAL FIELD OF INVENTION

The invention generally relates to wire harness assemblies with grommets and more particularly relates to a wire harness assembly with a grommet having a wire spacing retainer that holds individual wires in a spaced relationship with one another and method for manufacturing such a wire harness assembly.

BACKGROUND OF THE INVENTION

Wire harness assemblies, such as those used in motor vehicles typically use grommets to protect the wire cables in the harness as they pass through panels in the vehicle, such as the bulkhead between the passenger and engine compartments. It may be desirable for the grommet to also provide a seal against liquid or gaseous intrusion, therefore a means of sealing the spaces between the individual wire cables and the grommet may be needed. Previously, mastic butyl tape has been applied to individual wire cables before the grommet is placed over the wire cable bundle. The tape is folded over to ensure coverage to each wire. The wire cable bundle is encapsulated with the tape, then the grommet is stretched over the encapsulated wire cable bundle to forma for a seal intended to inhibit fluid or gas leakage through the grommet. However, gaps between the tape wrapped wires or the grommet may remain and this configuration does not always result in a water-tight or air-tight seal. Therefore, method of sealing the wire cables to each other and to the grommet remains desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with one embodiment of this invention, a wire harness assembly is provided. The wire harness assembly includes a first wire cable, a second wire cable, and a wire support device defining an elongate first slot having an open end and a closed end. The first and second cables are disposed within the first slot. First and second protrusions are defined by first and second side walls of the first slot respectively. The first and second protrusions are configured to separate the first wire cable from the second wire cable. The wire harness assembly also includes a slug formed of a moldable material that encases the wire support device. The slug also encases a portion of the first wire cable and further encases a portion of the second wire cable. The wire harness assembly further includes a grommet encircling the slug.

The first protrusion defined by the first side wall may not be joined to the second protrusion defined by the second side wall opposite the first side wall. First surfaces of the first and second protrusions facing the open end may define an angle of less than or equal to forty five degrees relative to the first and second side walls respectively. Second surfaces of the first and second protrusions facing the closed end may define an angle of about ninety degrees relative to the first and second side walls respectively. A diameter of the first wire cable may be different than a diameter of the second wire cable.

The wire harness assembly may further include a third wire cable and the wire support device may define an elongate second slot that is distinct from the first slot. The third wire cable may be disposed within the second slot. A diameter of the third wire cable is different than least one of a diameter of the first wire cable and a diameter of the second wire cable.

The wire support device may further include a moveable retainer that is configured to close off the open end of the first and second slots. This moveable retainer may by integrally formed with the wire support device and may be attached to the wire support device by a living hinge. A free end of the moveable retainer opposite the living hinge may define a latch that is configured to secure the free end to the wire support device. The wire support device may be formed of a polymeric material and the slug may be formed of a polyurethane based material.

In accordance with another embodiment of this invention, a method of forming a wire harness assembly is provided. The method includes the step of providing a first wire cable and a second wire cable and providing a wire support device defining an elongate first slot having an open end and a closed end. First and second protrusions are defined by first and second side walls of the first slot respectively. The first and second protrusions are configured to separate the first wire cable from the second wire cable. The method also includes the step of arranging the first and second cables in the first slot such that the first wire cable is separated from the second wire cable by the first and second protrusions and arranging the wire support device and first and second cables in a mold. The method further includes the steps of injecting of a moldable material into the mold, curing the moldable material, thereby forming a slug encasing the wire support device, a portion of the first wire cable, and a portion of the second wire cable, and disposing the slug within a grommet.

The first protrusion defined by the first side wall may not be joined to the second protrusion defined by the second side wall opposite the first side wall. First surfaces of the first and second protrusions facing the open end may define an angle of less than or equal to forty five degrees relative to the first and second side walls respectively. Second surfaces of the first and second protrusions facing the closed end may define an angle of about ninety degrees relative to the first and second side walls respectively. A diameter of the first wire cable is different than a diameter of the second wire cable.

The wire support device may define an elongate second slot that is distinct from the first slot. The method may further include the steps of providing a third wire cable and disposing the third wire cable within the second slot. A diameter of the third wire cable may be different than least one of a diameter of the first wire cable and a diameter of the second wire cable.

The wire support device further may further include a moveable retainer. The method may further include the step of closing off the open end of the first and second slots using the moveable retainer. The moveable retainer may be integrally formed with the wire support device and attached to the wire support device by a living hinge. A free end of the moveable retainer opposite the living hinge may define a latch that is configured to secure the free end to the wire support device.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Presented herein is a wire harness assembly, such as is used in a motor vehicle, that includes a grommet. The grommet surrounds a slug that is molded around the individual wire cables of the wire harness. A wire support device which is configured to hold the individual wire cables apart is molded inside the slug. This wire support device holds the individual wire cables apart from one another so that the material forming the slug can completely surround each wire cable, preventing the formation of voids in the material that may develop when the slug is molded if wire cables are adjacent or touching each other.

Figure 1:
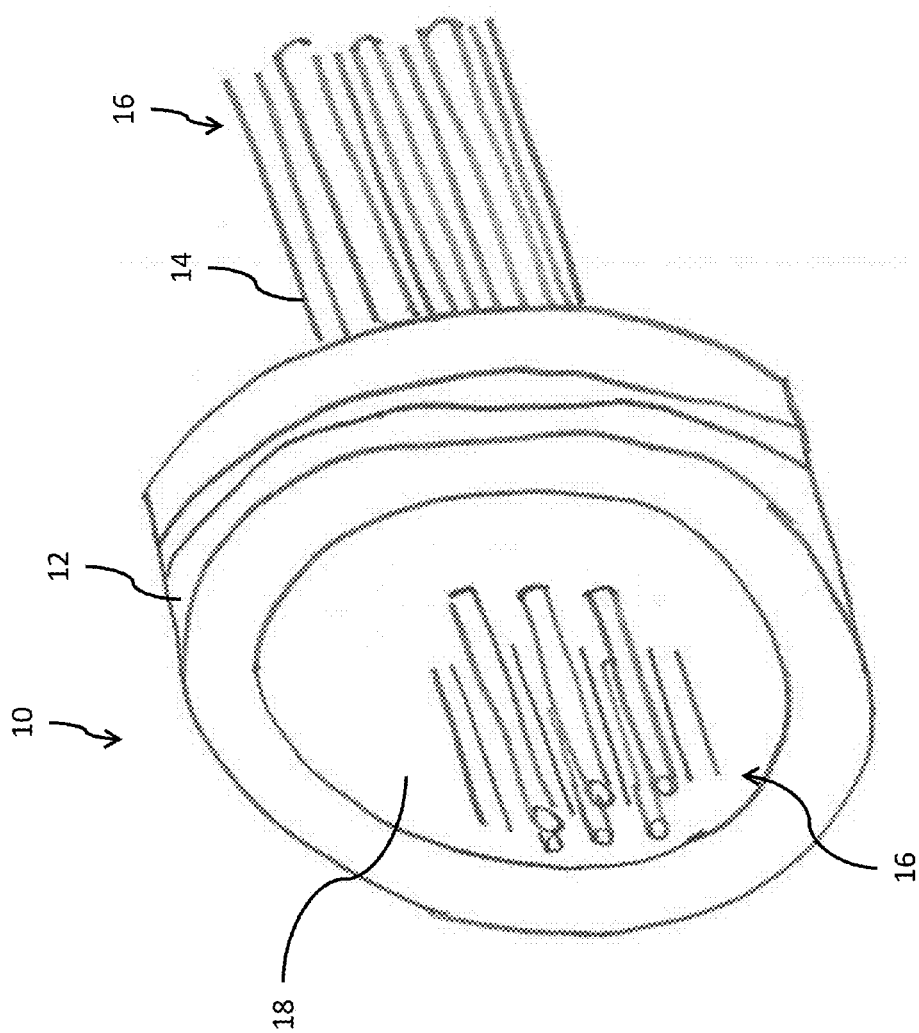
FIG. 1 is perspective view of a wire harness assembly in accordance with one embodiment.

FIG. 1 illustrates a non-limiting example of a wire harness assembly 10 having a circular grommet 12 configured to protect an insulating outer jacket 14 of individual wire cables 16 when the wire harness passes through a panel (not shown), such as the bulkhead between the passenger compartment and the engine compartment in a motor vehicle. A section of the wire cables 16 passing through the grommet 12 are encased in a slug 18 formed of a moldable material, such as a polyurethane material. The slug 18 completely surrounds a section of the jacket 14 of each of the wire cables 16 in the wire harness assembly 10 and is in intimate contact with the each of the jackets 14, thus inhibiting leak paths for gasses or fluids along the surfaces of the jackets 14. The grommet 12 is formed of a complaint material, such as a silicone-based rubber and is stretched over the outer circumferential surface of the slug 18 so that the grommet 12 is in intimate contact with the slug 18, thereby inhibiting leak paths for gasses or fluids along the outer circumferential surface of the slug 18. Therefore, the wire harness assembly 10 presented herein is resistant to gas or fluid intrusion or infiltration.

Figure 2:
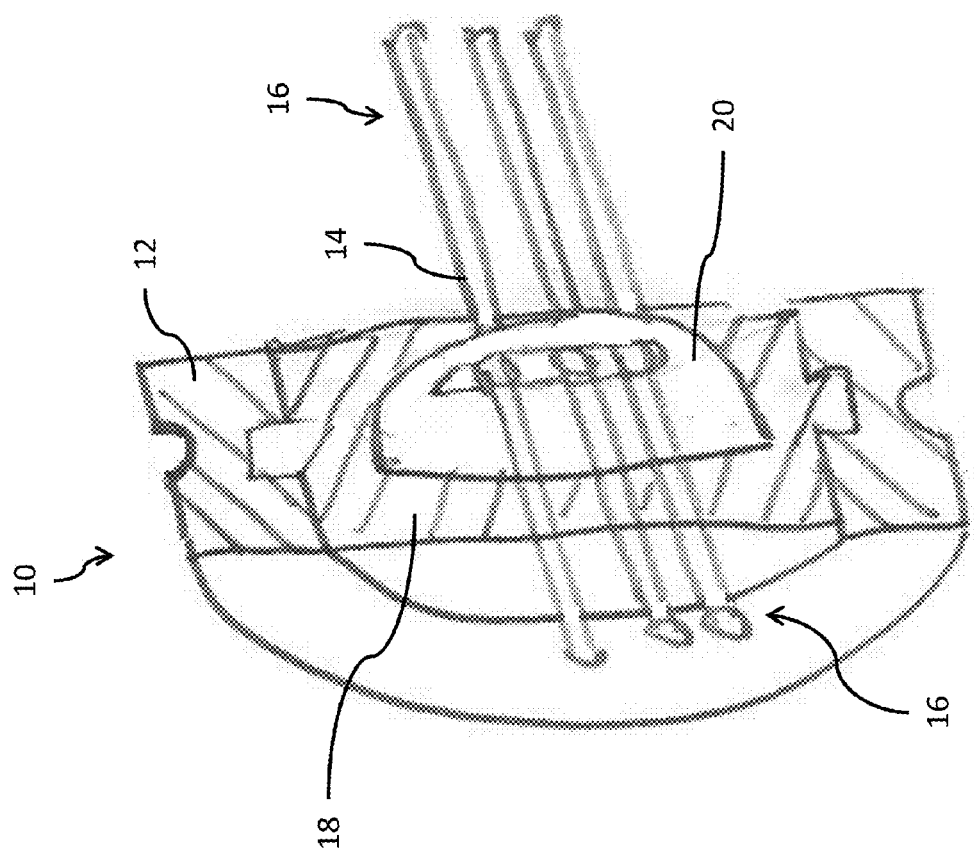
FIG. 2 is a cutaway view of the wire harness assembly of FIG. 1 including a wire support device in accordance with one embodiment.

As shown in FIG. 2, the wire harness assembly 10 includes a wire support device 20, hereinafter referred to as a wire support 20, embedded within the slug 18. The wire support 20 in this non-limiting example is a perforated disc shaped plate that is configured to hold the individual wire cables 16 away from one another as the slug 18 is formed, thereby allowing the material forming the slug 18 to completely surround the section of the jacket 14 of each of the wire cables 16 within the slug 18. The wire support 20 is embedded within the slug 18 by placing the wire support 20 within a mold and pouring or injecting a moldable material, such as a polyurethane material, into the mold and removing the slug 18 from the mold after the moldable material has cured.

Figure 3:
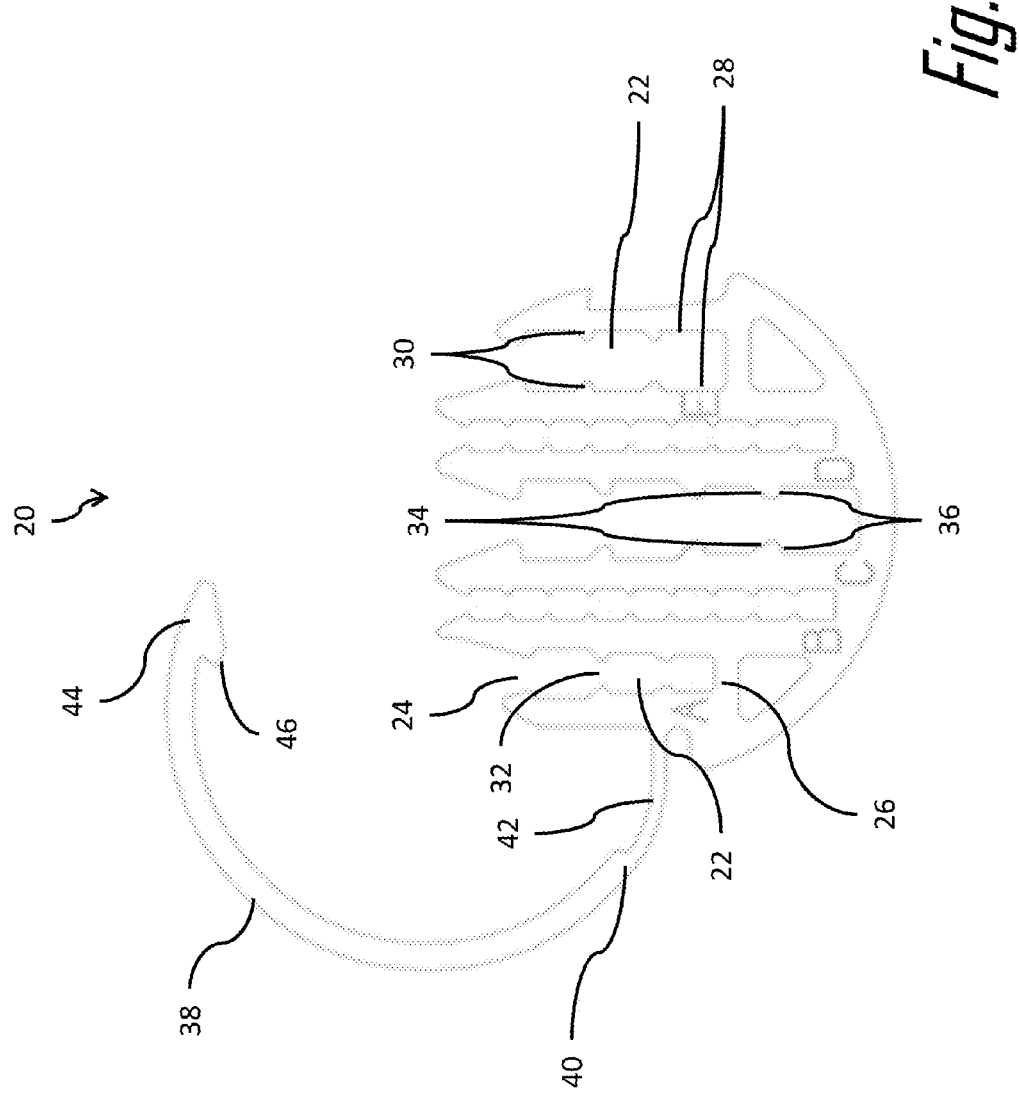
FIG. 3 is a front view of the wire support device of FIG. 2 in accordance with one embodiment.
Figure 4:
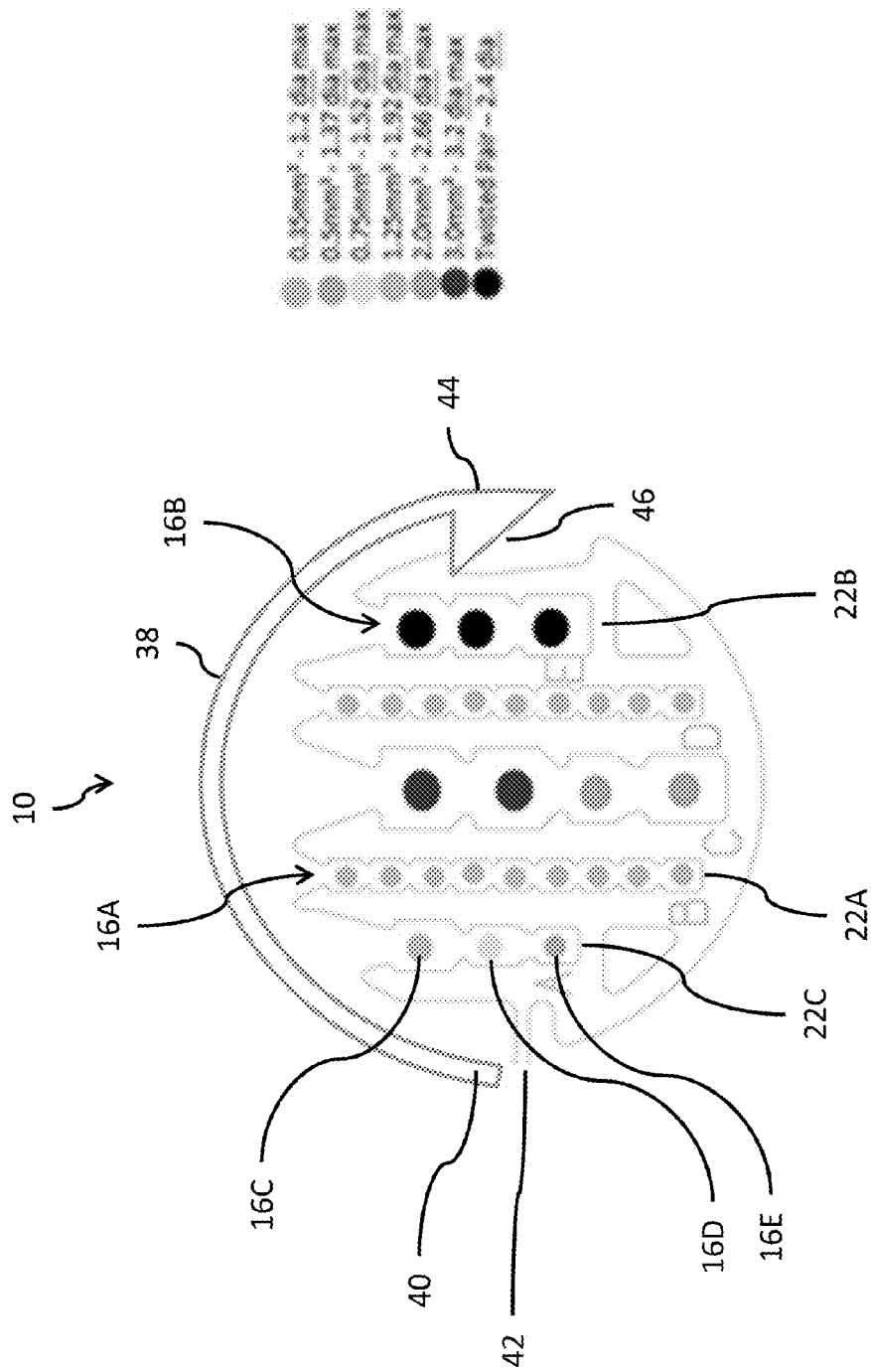
FIG. 4 is a front view of the wire support device of FIG. 3 with wire cables inserted in accordance with one embodiment.

A non-limiting example of the wire support 20 is shown in FIGS. 3 and 4. The wire support 20 is a disk shaped plate formed of a polymeric material, such as polyamide (NYLON). In alternative embodiments, the shape of the wire support may be changed from a disk to any other planar shape to accommodate the shape of the grommet which may be dictated by the shape of an opening in a panel through which the wire harness assembly passes. The wire support 20 defines a plurality of slots 22 of varying widths each having a closed end 24 and an open end 26. Opposed side walls 28 of the slots 22 define pairs of opposed protrusions 30, in this example having a saw tooth shape that are configured to retain the wire cables 16 within the slots 22. These protrusions 30 are hereinafter referred to as retaining teeth 30. There is a gap 32 between each pair of retaining teeth 30 that allows a wire cable 16 to pass between each pair of retaining teeth 30 when it is inserted into the open end 26 of the slot 22. Upper surfaces 34 of the retaining teeth 30 that are facing the open end 26 of the slot 22 are angled at an angle of less than or equal to 45° relative to the side walls 28 from which they protrude. Lower surfaces 36 of the retaining teeth 30 that are facing the closed end 24 of the slot 22 are angled at an angle of about 90° relative to the side walls 28 from which they protrude. As used herein, about ninety degrees may be in range from 75° to 105° inclusive. The retaining teeth 30 are configured to provide a lower resistance force to the wire cable 16 as it is inserted into the slot 22 than when it is removed from the slot 22, thereby inhibiting inadvertent removal of a wire cable 16 from the slot 22.

As shown in FIGS. 3 and 4, there may be multiple pairs of retaining teeth 30 defined by each of the slots 22. When more than one wire cable 16 is disposed in a slot 22, a pair of retaining teeth 30 will be positioned intermediate each wire cable 16 to provide proper spacing between the wire cables 16.

While saw tooth shaped retaining teeth 30 are shown in the wire support 20 example of FIGS. 3 and 4, other embodiments of the wire support may include retaining teeth with triangular, semicircular, or arcuate shapes.

The plurality of slots 22 are generally parallel to one another so that all of the open ends 26 of the slots 22 are located on one side of the wire support 20. The wire support 20 further includes an integral retainer 38 that has a generally arcuate shape. A fixed end 40 of the retainer 38 is attached to the wire support 20 by a living hinge 42 and a free end 44 of the retainer 38 defines a latching feature 46 configured to attach the free end 44 to the wire support 20. As shown in FIG. 3, when the free end 44 is unattached, the open ends 26 of the slots 22 are accessible, allowing an assembly technician or machine (not shown) to insert wire cables 16 within the slots 22. As shown in FIG. 4, when the latching feature 46 on free end 44 of the retainer 38 is engaged with the wire support 20, the open ends 26 of the slots 22 are closed off, inhibiting removal of the wire cables 16 from the slots 22.

The parallel slots 22 of the wire support 20 of FIGS. 3 and 4 allow the use of a single retainer 38 to close off the open ends 26 of the slots 22. Other embodiments of the wire support have slots with different orientations to each other, for example in a radial orientation. These alternative embodiment may require a separate retainer or more than one integral retainer. In yet other embodiments, the wire spacer may not include a retainer and instead rely on the retaining teeth to secure the wire cables within the slots.

According to the wire support 20 shown in FIG. 4, the opposed side walls 28 of each slot 22 are substantially parallel to one another and the width of the slot 22A may by generally constant to accommodate a plurality of wire cables 16A having the same diameter. Different slots 22A, 22B may be have different widths to accommodate wire cables 16 having different diameters. The size of the retaining teeth 30 may also be adjusted to accommodate wire cables 16A, 16B having different diameters as illustrated in FIG. 4. As shown in FIG. 4, the width of a slot is also varied to accommodate wire cables 16C, 16D, 16E having different diameters within a single slot 22C.

Figure 5:
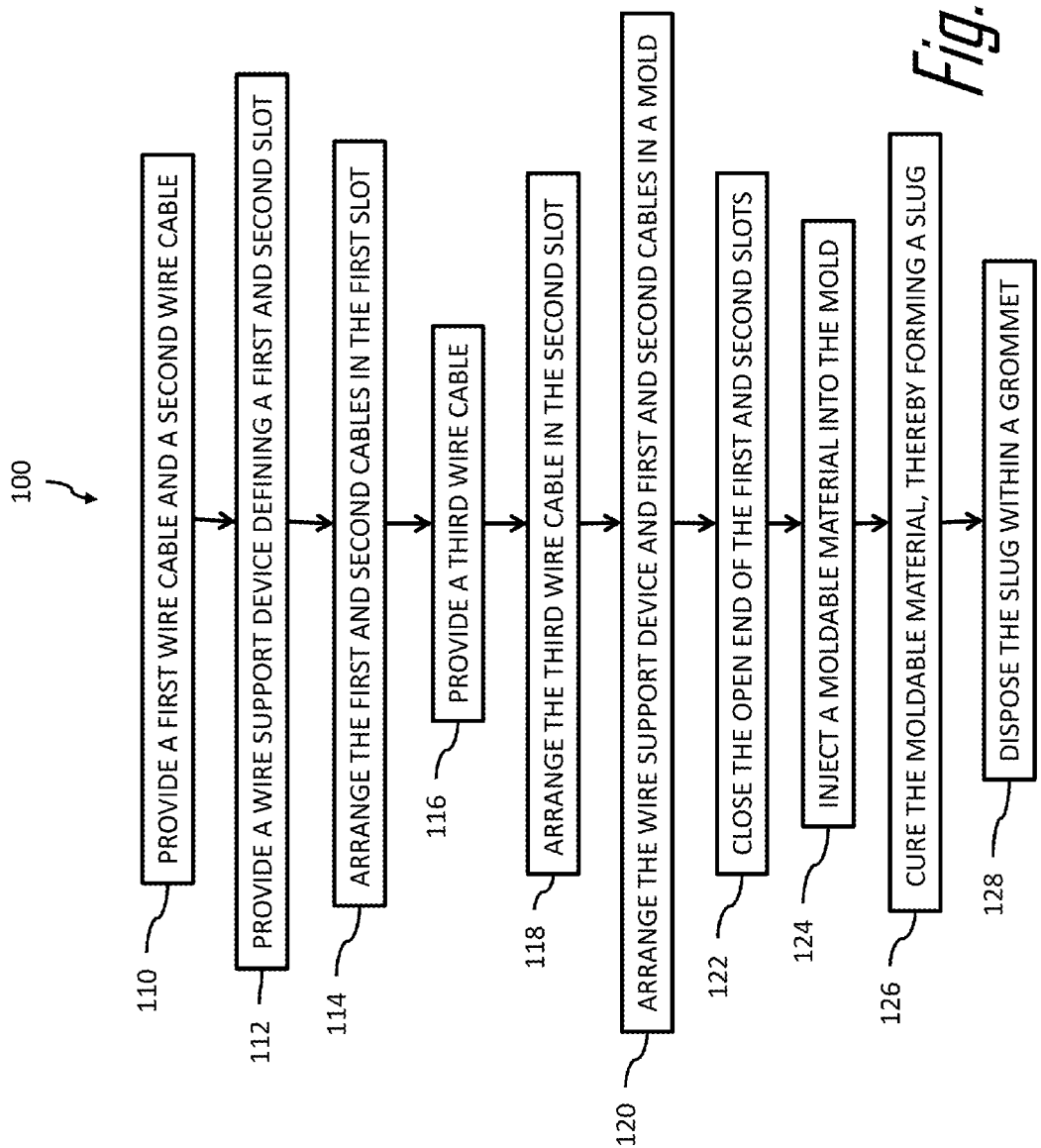
FIG. 5 is a flow chart of a method of forming the wire harness assembly of FIG. 1 in accordance with one embodiment.

FIG. 5 illustrates a flow chart of a method 100 of forming a wire harness assembly 10 that includes the following steps:

STEP 110, PROVIDE A FIRST WIRE CABLE AND A SECOND WIRE CABLE, includes providing at least a first and second wire cable 16A;

STEP 112, PROVIDE A WIRE SUPPORT DEVICE DEFINING A FIRST AND SECOND SLOT, includes providing a wire support device 20, such as the wire support 20 having a first and second slot 22A, 22B as illustrated in FIG. 3 and as described supra;

STEP 114, ARRANGE THE FIRST AND SECOND CABLES IN THE FIRST SLOT, includes inserting the first and second wire cables 16A into the open end 26 of the first slot 22A of the wire support device 20 and arranging the first and second wire cables 16A within the first slot 22A as illustrated in FIG. 4. The first and second wire cables 16A may be separated within the first slot 22A by a pair retaining teeth 30 as described supra;

STEP 116, PROVIDE A THIRD WIRE CABLE, is an optional step that includes providing at least a third wire cable 16B;

STEP 118, ARRANGE THE THIRD WIRE CABLE IN THE SECOND SLOT, is an optional step that includes inserting the third wire cable 16B into the open end 26 of the second slot 22B of the wire support device 20 and arranging the third wire cable 16B within the second slot 22B as shown in FIG. 4. The second slot 22B is distinct from the first slot 22A;

STEP 120, ARRANGE THE WIRE SUPPORT DEVICE AND FIRST AND SECOND CABLES IN A MOLD, includes arranging the wire support device 20 and at least the first and second wire cables 16A in a mold (not shown) that is shaped to form a slug 18;

STEP 122, CLOSE THE OPEN END OF THE FIRST AND SECOND SLOTS, is an optional step that includes closing the open ends 26 of the first and second slots 22A, 22B to inhibit removal of at least the first, second and/or third wire cables 16A, 16B from the first and/or second slots 22A, 22B. The wire support device 20 may include a retainer 38 as illustrated in FIG. 4 and as described supra to close the open ends 26;

STEP 124, INJECT A MOLDABLE MATERIAL INTO THE MOLD, includes injecting a moldable material in a fluid state, such as a polyurethane material, into the mold so that it surrounds each of at least the first and second wire cables 16A. As used herein, the term inject may mean applying a pressure to force the moldable material into the mold, applying a vacuum to draw the moldable material into the mold, or pouring the moldable material into the mold under ambient pressure;

STEP 126, CURE THE MOLDABLE MATERIAL, THEREBY FORMING A SLUG, includes curing the moldable material so that it hardens, thereby forming a slug 18 enclosing the wire support device 20 and a portion of the first and second wire cables 16A. The moldable material may be cured by application of heat, exposure to ultraviolet light, oxidation, or any other method applicable to cure and harden the moldable material; and STEP 128, DISPOSE THE SLUG WITHIN A GROMMET, includes surrounding at least a perimeter of the slug 18 with a grommet 12 such as described supra.

Accordingly, wire harness assembly 10 and a method 100 of forming such a wire harness assembly is provided. The wire support 20 maintains separation of the individual wire cables 16 so that the material forming the slug 18 can surround each individual wire cables 16 inhibiting the formation of voids that can occur when wires are contacting each other in the mold. The elimination of voids provides a wire harness assembly 10 that is resistant to fluid or gas infiltration through the grommet 12. The hinged retainer 38 of the wore support also helps to keep the wire cables 16 in place when the slug 18 is formed around the wire cables 16 The wire harness assembly 10 also provides an advantage of more consistent fit of the grommet 12 over the wire cables 16 compared with using mastic tape as described in the BACKGROUND OF THE INVENTION.

While this invention has been described in terms of the preferred embodiments thereof, it is not intended to be so limited, but rather only to the extent set forth in the claims that follow. Moreover, the use of the terms first, second, upper, lower, etc. does not denote any order of importance or orientation, but rather the terms first, second, upper, lower, etc. are used to distinguish one element from another. Furthermore, the use of the terms a, an, etc. do not denote a limitation of quantity, but rather denote the presence of at least one of the referenced items.

We claim:

1. A wire harness assembly, comprising:
a first wire cable having a first insulating jacket;
a second wire cable having a second insulating jacket;
a planar wire support device defining an elongate first slot extending from an outer edge to an inner portion of the wire support device, said first slot having an open end at the outer edge and a closed end in the inner portion, wherein the first and second cables are disposed within the first slot and wherein a pair of tooth like projections are defined opposite one another by first and second side walls of the first slot, said pair of tooth like projections configured to separate the first wire cable from the second wire cable in the first slot;
a slug formed of a moldable material that encases the wire support device and completely surrounds a section of the first and second insulating jacket, wherein said slug is in intimate contact with the first and second insulating jacket of the first and second wire cable respectively; and
a grommet encircling the slug.

2. The wire harness assembly according to claim 1, wherein the wire support device is characterized as a disk shaped plate.

3. The wire harness assembly according to claim 2, wherein the wire support device further comprises a moveable arcuate shaped retainer configured to close off the open end of the first slot.

4. The wire harness assembly according to claim 3, wherein the moveable retainer is integrally formed with the wire support device and attached to the wire support device by a living hinge.

5. The wire harness assembly according to claim 4, wherein a free end of the moveable retainer opposite the living hinge defines a latch configured to secure the free end to the wire support device.

6. The wire harness assembly according to claim 1, wherein the pair of tooth like projections are characterized as having a saw tooth shape with first surfaces facing the open end that define an angle of less than or equal to forty five degrees relative to the first and second side walls and second surfaces facing the closed end that define an angle of about ninety degrees relative to the first and second side walls.

7. The wire harness assembly according to claim 6, wherein a diameter of the first wire cable is different than a diameter of the second wire cable.

8. The wire harness assembly according to claim 7, further comprising a third wire cable and wherein the wire support device defines an elongate second slot extending from the outer edge to the inner portion of the wire support device, said second slot having an open end at the outer edge and a closed end in the inner portion, wherein the second slot is distinct from the first slot, and wherein the third wire cable is disposed within the second slot.

9. The wire harness assembly according to claim 8, wherein a diameter of the third wire cable is different than at least one of a diameter of the first wire cable and a diameter of the second wire cable.

10. The wire harness assembly according to claim 1, wherein the wire support device is formed of a polyamide material and wherein the slug is formed of a polyurethane material.

11. A method of forming a wire harness assembly, comprising the steps of:
providing a first wire cable having a first insulating jacket and a second wire cable having a second insulating jacket;
providing a planar wire support device defining an elongate first slot extending from an outer edge to an inner portion of the wire support device, said first slot having an open end at the outer edge and a closed end in the inner portion, wherein the first and second cables are disposed within the first slot and wherein a pair of tooth like projections are defined opposite one another by first and second side walls of the first slot, said pair of tooth like projections configured to separate the first wire cable from the second wire cable in the first slot;
arranging the first and second cables in the first slot such that the first wire cable is separated from the second wire cable by the pair of tooth like projections;
arranging the wire support device and first and second cables in a mold;
injecting a moldable material into the mold;
curing the moldable material, thereby forming a slug encasing the wire support device, a portion of the first wire cable, and a portion of the second wire cable; and
disposing the slug within a grommet.

12. The method according to claim 11, wherein the wire support device is characterized as a disk shaped plate.

13. The method according to claim 12, wherein the wire support device further comprises a moveable arcuate shaped retainer configured to close off the open end of the first slot and wherein the method further comprises the step of closing off the open end of the first slot using the moveable retainer.

14. The method according to claim 13, wherein the moveable retainer is integrally formed with the wire support device and attached to the wire support device by a living hinge.

15. The method according to claim 14, wherein a free end of the moveable retainer opposite the living hinge defines a latch configured to secure the free end to the wire support device.

16. The method according to claim 11, wherein the pair of tooth like projections are characterized as having a saw tooth shape with first surfaces facing the open end that define an angle of less than or equal to forty five degrees relative to the first and second side walls and second surfaces facing the closed end that define an angle of about ninety degrees relative to the first and second side walls.

17. The method according to claim 11, wherein a diameter of the first wire cable is different than a diameter of the second wire cable.

18. The method according to claim 11, wherein the wire support device defines an elongate second slot extending from the outer edge to the inner portion of the wire support device, said second slot having an open end at the outer edge and a closed end in the inner portion, wherein the second slot is distinct from the first slot, and wherein the method further comprises the steps of:
providing a third wire cable; and
disposing the third wire cable within the second slot.

19. The method according to claim 18, wherein a diameter of the third wire cable is different than at least one of a diameter of the first wire cable and a diameter of the second wire cable.

20. The method according to claim 11, wherein the wire support device is formed of a polyamide material and wherein the slug is formed of a polyurethane material.

* * * * *